(12) United States Patent
Paleja et al.

(10) Patent No.: US 9,262,598 B1
(45) Date of Patent: Feb. 16, 2016

(54) DIGITAL RIGHTS MANAGEMENT FOR APPLICATIONS

(71) Applicant: Amazon Technologies, Inc., Reno, NV (US)

(72) Inventors: Ameesh Paleja, Irvine, CA (US); Yael Peled, Los Angeles, CA (US); Mekka C. Okereke, Irvine, CA (US); Timothy E. Finer, Mission Viejo, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/249,685

(22) Filed: Apr. 10, 2014

Related U.S. Application Data (63) Continuation of application No. 13/044,478, filed on Mar. 9, 2011, now Pat. No. 8,719,586.

(51) Int. Cl.
| | |
|---|---|
| *G06F 21/12* | (2013.01) |
| *G06F 21/16* | (2013.01) |
| *G06F 21/33* | (2013.01) |
| *G06F 21/64* | (2013.01) |
| *G06F 21/10* | (2013.01) |

(52) U.S. Cl.
CPC ............... *G06F 21/10* (2013.01); *G06F 21/12* (2013.01); *G06F 21/16* (2013.01); *G06F 21/33* (2013.01); *G06F 21/64* (2013.01)

(58) Field of Classification Search
CPC ......... G06F 21/12; G06F 21/16; G06F 21/33; G06F 21/64
See application file for complete search history.

(56) References Cited

U.S. PATENT DOCUMENTS

| | | |
|---|---|---|
| 5,138,712 A | 8/1992 | Corbin |
| 7,555,464 B2 | 6/2009 | Candelore |
| 7,590,863 B2 | 9/2009 | Lambert |
| 7,757,097 B2 | 7/2010 | Atallah et al. |
| 7,841,010 B2 | 11/2010 | Lerouge et al. |
| 7,877,461 B1 | 1/2011 | Rimmer |
| 7,971,071 B2 | 6/2011 | Walkoe et al. |
| 8,112,809 B2 | 2/2012 | Chou et al. |
| 8,156,049 B2 | 4/2012 | Mahlbacher |

(Continued)

OTHER PUBLICATIONS

U.S. Appl. No. 13/044,478, filed Mar. 9, 2011, Paleja et al.

(Continued)

*Primary Examiner* — Dede Zecher
*Assistant Examiner* — Jason C Chiang
(74) *Attorney, Agent, or Firm* — Knobbe, Martens, Olson & Bear, LLP (57) ABSTRACT

This disclosure describes systems and associated processes that provide digital rights management for applications. In some embodiments, these system and processes couple DRM protection with individual applications, rather than with a centralized service. For instance, these systems and processes can be implemented in the context of an application store or distribution service that distributes applications for purchase or for free to user devices. Developers can submit applications to the application distribution service for distribution to end users. In response to receiving an application from a developer, the application distribution service can modify the application to include DRM features. The application distribution service can accomplish this modification without input from or the knowledge of the developer. The DRM features included in the modified application can prevent or otherwise reduce copying or modifying of the application.

23 Claims, 6 Drawing Sheets

(56) References Cited

U.S. PATENT DOCUMENTS

| | | | |
|---|---|---|---|
| 8,458,673 B2 | 6/2013 | Gadea et al. | |
| 8,464,066 B1 | 6/2013 | Price et al. | |
| 2003/0028653 A1* | 2/2003 | New et al. | 709/229 |
| 2004/0039926 A1 | 2/2004 | Lambert | |
| 2004/0205333 A1* | 10/2004 | Bjorkengren | 713/153 |
| 2004/0237067 A1* | 11/2004 | Sun et al. | 717/110 |
| 2005/0085222 A1* | 4/2005 | Przybilski et al. | 455/418 |
| 2005/0138400 A1* | 6/2005 | Wu et al. | 713/189 |
| 2006/0080529 A1* | 4/2006 | Yoon et al. | 713/168 |
| 2006/0242082 A1* | 10/2006 | Margalit et al. | 705/59 |
| 2007/0067643 A1* | 3/2007 | Zhuk et al. | 713/187 |
| 2007/0256064 A1 | 11/2007 | Torrubia et al. | |
| 2007/0256138 A1 | 11/2007 | Gadea et al. | |
| 2008/0086777 A1* | 4/2008 | Sanchez | 726/26 |
| 2008/0092107 A1* | 4/2008 | McWilliam et al. | 717/101 |
| 2008/0097922 A1* | 4/2008 | Davydov et al. | 705/54 |
| 2008/0256368 A1 | 10/2008 | Ross et al. | |
| 2008/0307229 A1* | 12/2008 | Andersson et al. | 713/176 |
| 2009/0210698 A1* | 8/2009 | Candelore | 713/153 |
| 2010/0023927 A1 | 1/2010 | Yang et al. | |
| 2010/0299759 A1* | 11/2010 | Kim et al. | 726/28 |
| 2011/0213941 A1* | 9/2011 | Chou et al. | 711/164 |
| 2011/0225417 A1 | 9/2011 | Maharajh et al. | |
| 2012/0144202 A1 | 6/2012 | Counterman | |
| 2012/0330786 A1 | 12/2012 | Paleja et al. | |

OTHER PUBLICATIONS

Chuang Nguyen, App Store DRM Policy Gets Tightened at Apple for iPhone, [http://pocketnow.com/smartphone-news/app-store-drm-policy-gets-tightened-at-apple-for-iphone] Jun. 1, 2009 in 2 pages.

* cited by examiner

DIGITAL RIGHTS MANAGEMENT FOR APPLICATIONS

RELATED APPLICATIONS

This application is a continuation of U.S. application Ser. No. 13/044,478, filed Mar. 9, 2011 and titled "DIGITAL RIGHTS MANAGEMENT FOR APPLICATIONS," the disclosure of which is hereby incorporated by reference in its entirety.

BACKGROUND

Developing applications for computer systems, including mobile applications for wireless devices, can be very expensive. As mobile applications (sometimes called "apps") become more sophisticated, the development costs are likely to increase. In addition to the development costs, there are often marketing costs that raise the overall cost to an organization that develops and sells applications.

With the costs of developing and marketing applications being so high, a large sales volume may be required to recoup costs. Thus, each time a user obtains an unauthorized copy of an application, it becomes more difficult to recoup the costs expended and to make a profit from developing and marketing the application.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

A number of application developers and application providers implement various digital rights management ("DRM") systems to reduce software piracy. These DRM systems suffer from a number of flaws. For instance, some existing DRM systems use secure storage on a computing device to store an encryption key that the DRM system uses to allow application execution. However, certain computing devices, such as some mobile devices based on the Android™ operating system from Google®, Inc., do not include secure storage for these keys. As a result, using an existing DRM solution could allow an encryption key to be easily compromised, for instance, by someone who obtains root-level or administrator-level access to a device. Some DRM existing systems also require a computing device to communicate with a server for authorization before the computing device can execute an application. However, such online authorization may prevent the computing device from executing the application when a network connection is unavailable, such as during many airplane flights.

Further, some malicious developers purposefully create malicious applications, or malware, that harm a user's computer system or that access private data for some malicious purpose. It can be challenging for the mainstream user to determine whether an application includes malware. As the number of applications that are produced by independent developers increases, it becomes more difficult for application providers to identify and block malicious applications.

This disclosure describes systems and associated processes that provide digital rights management for applications. In certain embodiments, these system and processes can advantageously couple DRM protection with individual applications, rather than with a centralized service. For instance, these systems and processes can be implemented in the context of an application store or distribution service that distributes applications for purchase or for free to user devices. Developers can submit applications to the application distribution service for distribution to end users. In response to receiving an application from a developer, the application distribution service can modify the application to include DRM features. In one embodiment, the application distribution service can accomplish this modification without input from or the knowledge of the developer. The DRM features included in the modified application can prevent or otherwise reduce copying or modifying of the application. These and other features are described in greater detail below with respect to the Figures.

As used herein, the term "application," in addition to having its ordinary meaning, can mean, among other things, executable code or instructions, interpreted code or instructions (such as Java™ bytecode), scripted code, source code, object code, assembly code, any of the above together with associated data, and the like.

II. Application Distribution Environment Overview

Figure 1:
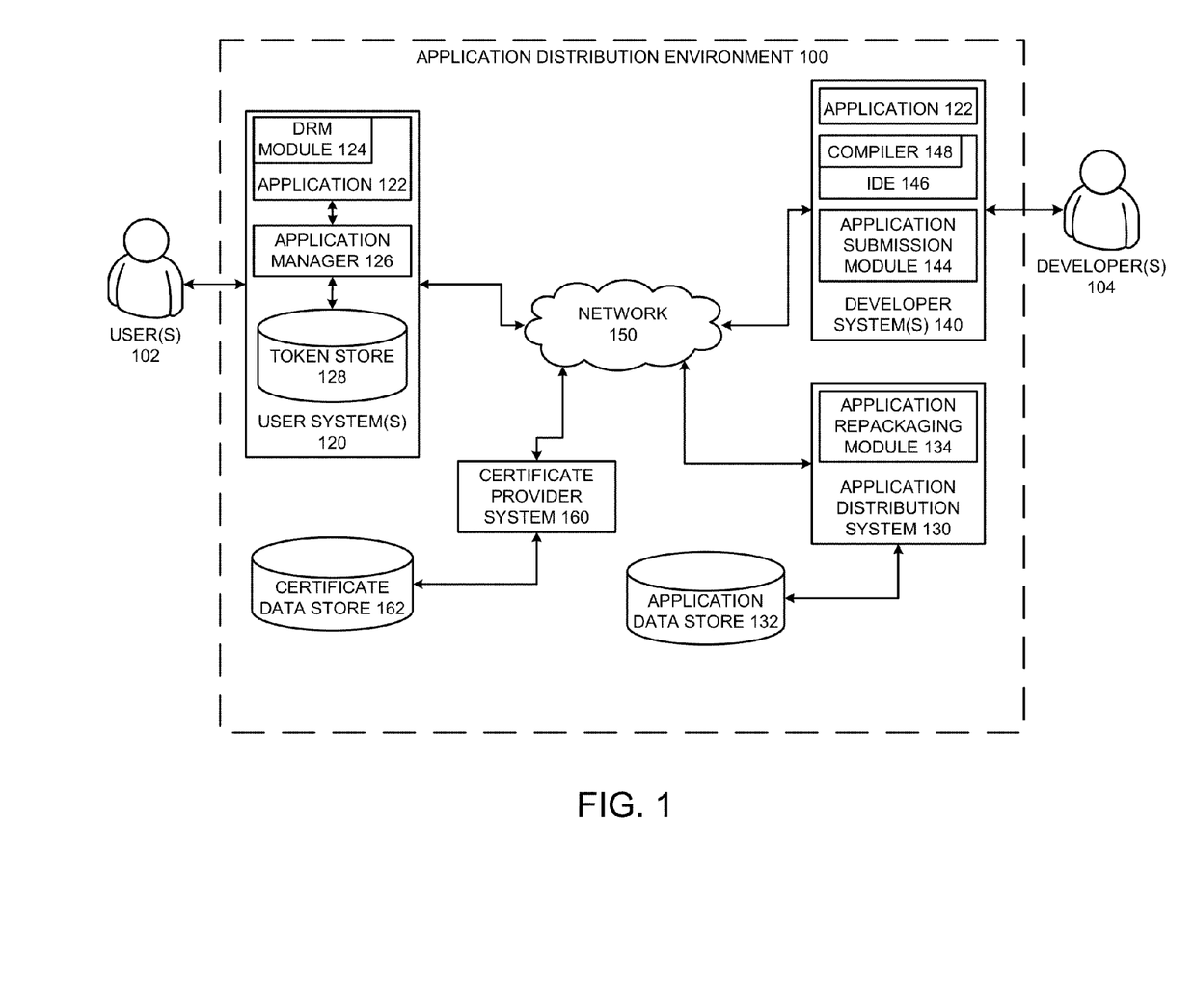
FIG. 1 illustrates an embodiment of a computing environment in accordance with the teachings of the present disclosure.

FIG. 1 illustrates an embodiment of an application distribution environment 100 that can implement the DRM systems and processes described above. In the application distribution environment 100, developers 104 can submit applications to an application distribution system 130, which provides the applications to end user systems 120. The application distribution system 130 includes features for providing DRM protection to these applications. Further, the user systems 120 can implement certain DRM features to prevent or otherwise reduce copying or modifying of the applications.

The application distribution system 130 can include any system capable of receiving the applications from the developers 104 and providing the applications to the users 102. Throughout this disclosure, the use of the phrase "providing an application" and its derivatives, is intended to be a non-limiting way of describing making an application available to users, e.g., via download, streaming, application virtualization, or the like. This can include, for example, making the application available for a one-time cost, for a subscription, or for free. Further, this can include, for example, making the application available to any number of users, to a predetermined number of users, to a predetermined set of users, for a limited time, for a limited number of uses, or indefinitely.

The user systems 120 and developer systems 140 can communicate with the application distribution system 130 over a network 150. The network 150 may include any system for allowing multiple computing devices to communicate with each other. For example, the network 150 can be a LAN, a WAN, the Internet, combinations of the same, or the like.

The systems 120 and 140 can generally include any computing device(s), such as desktops, laptops, wireless mobile devices (such as smart phones, PDAs, tablets, or the like), video game platforms, television set-top boxes, televisions (e.g., internet TVs), and computerized appliances, to name a few. Further, it is possible for the systems 120, 140 to be different types of devices, to include different applications, or to otherwise be configured differently. In addition, the systems 120 and 140 can include any type of operating system ("OS"). For example, the computing devices 120, 140 can implement an Android™ OS, a Windows® OS, a Mac® OS, a Linux or Unix-based OS, or the like.

In general, the application 122 can include any type of application that is designed to be executed by a device that is of the same type as the user systems 120. For example, if the user systems 120 is a smart phone running Android 2.2, then the application 122 represents any application designed to be executed by at least a smart phone running Android 2.2. In some embodiments, the application 122 may be designed to work on a subset of the user system 120.

As previously mentioned, the application distribution system 130 can provide DRM protection for applications. In one embodiment, to facilitate providing DRM protection, the application distribution system 130 can combine the application 122 with a DRM module 124. The DRM module 124 includes any system that can verify that the application 122 has not been modified and that can prevent unauthorized users from accessing and/or executing the application 122. In one embodiment, the DRM module 124 does not prevent copying and/or moving the application 122 within a user system 120, from one user system 120 to another user system, or from a user system 120 to a recordable medium, such as an SD card, a CD, or a USB key, to name a few. Advantageously, in some embodiments, if the application 122 is copied from a user system 120 to a second user system, the DRM module 124 can prevent the application 122 from being executed on the second user system. Alternatively, in some embodiments, the DRM module 124 will not prevent execution of the application 122 on the second user system, for example, so long as the same user is using the application 122.

To facilitate combining the DRM module 124 with the application 122, the application distribution system 130 can include an application repackaging module 134. The application repackaging module 134 can include any system capable of decompiling the application 122, combining the DRM module 124 with the decompiled application, and recompiling the application 122 with the DRM module 124.

In one embodiment, providing DRM protection to the application 122 can include verifying that the application 122 has not been modified and preventing unauthorized users (or devices) from accessing and/or executing the application 122. These DRM protections can be implemented via a variety of processes. One such process can include the DRM module 124 analyzing a security token created by the application distribution system 130 that is associated with the application 122. The security token can be created to include a checksum of the application 122 and information relating to the user who purchases or accesses the application 122 from the application distribution system 130. For example, the security token can include a user identifier and a device identifier, to name a couple. In some embodiments, the security token can include additional features as described below. In one embodiment, analyzing the security token can include determining that the application distribution system 130 created the security token. In one embodiment, analyzing the security token can include the DRM module 124 creating a checksum of the application 122 and comparing the checksum to one included with the security token.

In one embodiment, the security token can be included with the application 122. In one embodiment, the security token can be included with the DRM module 124. Alternatively, the DRM module 124 can perform security token-less DRM protection.

In response to the users 102 purchasing or otherwise accessing a copy of the application 122, the application distribution system 130 can provide the application 122 along with the security token to the user systems 120. In one embodiment, the users 102 can use an application manager 126 to facilitate obtaining or accessing the application 122.

The application manager 126 can include any system that is capable of requesting an application, such as the application 122, from the application distribution system 130, and, in response to the request, receiving the application and a security token associated with the application. Further, the application manager 126 includes any system capable of storing the security token at the security token store 128 and retrieving the security token from the security token store 128 in response to a request from the DRM module 124 to access the security token. The security token store 128 includes any system capable of storing security tokens.

As previously mentioned, the developers 104 can submit the application 122 to the application distribution system 130. To facilitate submitting the application 122, the developers 140 can use an application submission module 144. The application submission module 144 can include any system that can provide the application 122 to the application distribution system 130. In some embodiments, the application submission module 144 can also include any system that can combine a DRM module, such as the DRM module 124, with an application. In some embodiments, application submission module 144 is capable of signing the application 122 with a developer certificate associated with the developer 104.

In developing the application 122, the developers can use an Integrated Developer Environment ("IDE"), such as IDE 146, and a compiler 148. The IDE 146 can include any system for facilitating code development. For example, for Java development, the IDE 146 can include the Eclipse IDE available from The Eclipse Foundation™. Further, the IDE can include the compiler 146, which can include any compiler capable of compiling source code associated with the application 122 into the application 122. In some embodiments, the IDE 146 can be used to combine the DRM module 124 with the application 122 instead of using the application repacking module 134 to do so.

A number of additional systems are included with the application distribution environment 100 to facilitate implementing the DRM systems. One such system is the application data store 132, which includes any system capable of storing applications. In one embodiment, the application distribution system 130 can store applications on and retrieve copies of applications from the application store 132. In one embodiment, the application distribution system 130 can include the application store 132.

In creating the checksum, one or more of a certificate associated with the developers 104 and a certificate associated with the application distribution system 130 can be included with the checksum. Further, in creating a security token, a certificate can be used to sign the security token, which provides a level of assurance that the security token has not been modified by an entity other than the entity that created the security token. The certificate provider system 160 can include any system capable of providing a digital certificate to a user or an organization. Generally, a digital certificate identifies a user or an organization and provides a level of assurance that the user or the organization is who he/she/it claims to be. This level of assurance is associated with the trust placed in the certificate authority that issues the certificate. The certificate typically includes, among possibly other things, a public key associated with the certificate owner's private key and an issuer that identifies an entity, the certificate authority, that verified the certificate owner. Non-limiting examples of certificate provider systems or certificate authorities include VeriSign™, GoDaddy™, and Comodo™. Generally, these certificate provider systems are the certificate issuers identified with the digital certificate. The certificate data store 162 includes any system for storing certificates. In one embodiment, the certificate provider system 160 includes the certificate data store 162.

III. Example Checksum Creation Process

Figure 2:
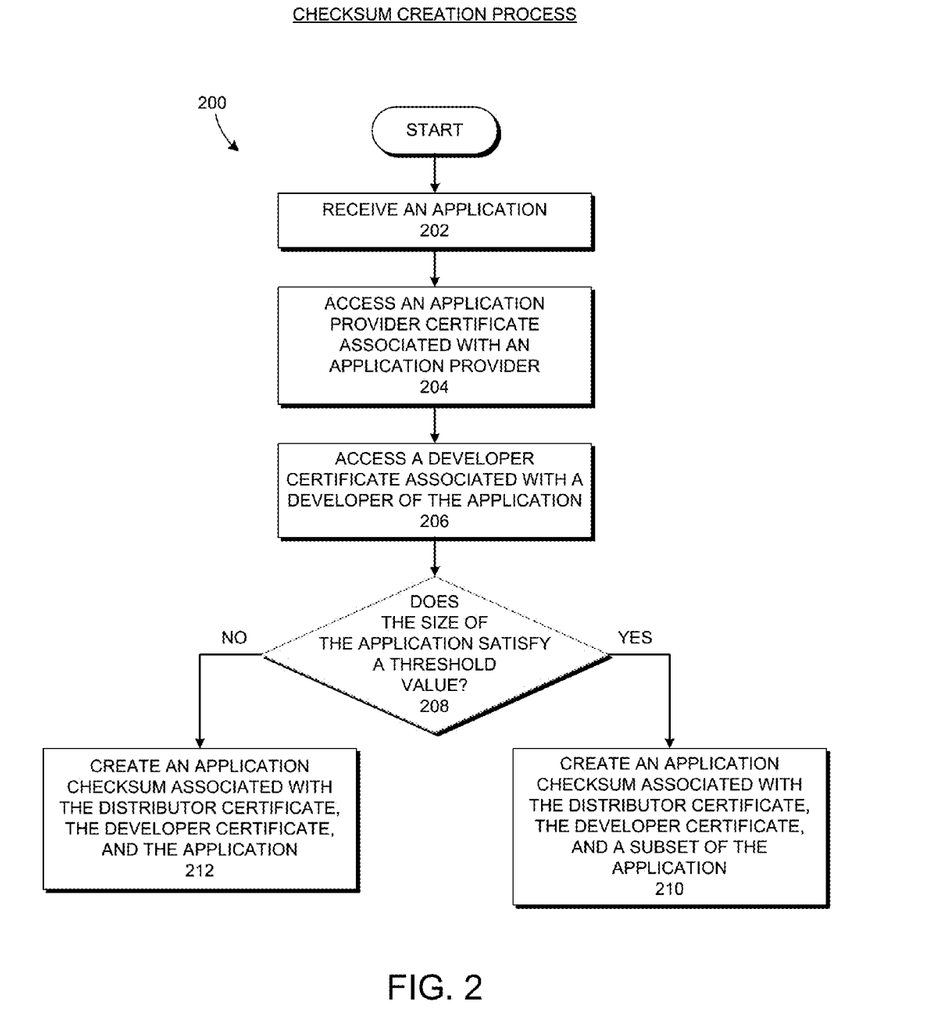
FIG. 2 illustrates a flow diagram for one embodiment of a checksum creation process.

FIG. 2 illustrates a flow diagram for one embodiment of a checksum creation process 200. The process 200 can be implemented by one or more of the application distribution system 130, the application manager 126, or the DRM module 124. In one embodiment, any system that can create a checksum of an application can use process 200. Advantageously, in certain embodiments, the process 200 enables faster checksum creation compared to other checksum processes. Although any number of systems can implement the process 200 with any application, to simplify discussion, the process 200 will be described as being implemented by the application distribution system 130 with respect to the application 122.

The process 200 begins at block 202, where an application is received, for example, by the application distribution system 130. In one embodiment, the application 122 includes the DRM module 124. At block 204, the application distribution system 130 accesses an application provider certificate associated with the application distribution system 130. In one embodiment, accessing the application provider certificate includes making a copy of the application provider certificate. In one embodiment, the application distribution system 130 can access the application provider certificate from one or more of: the application distribution system 130, the application store 132, the certificate system provider 160, and the certificate store 162.

At block 206, the application distribution system 130 accesses a developer certificate associated with the developer 104 who created the application 122. In one embodiment, accessing the developer certificate includes making a copy of the developer certificate. In one embodiment, the application distribution system 130 can access the developer certificate from one or more of: the application distribution system 130, the application store 132, the certificate system provider 160, the certificate store 162, and the application submission module 144. Both the application provider certificate and the developer certificate are issued by the certificate provider system 160. In one embodiment, the application provider certificate and the developer certificate can be issued by different certificate provider systems. In one embodiment, one or more of blocks 204 and 206 is optional.

At decision block 208, the application distribution system 130 determines if the size of the application 122 satisfies a threshold value. The threshold value is selected to ensure that the creation of a checksum is completed in less than a predetermined time. In one embodiment, the threshold value is selected to ensure that the creation of a checksum uses less than a predetermined level of CPU utilization. In one embodiment, the threshold value is selected to ensure that the creation of a checksum uses less than a predetermined amount of energy and/or battery consumption. If the application distribution system 130 determines that the size of the application 122 is less than the threshold value, the application distribution system 130 creates an application checksum associated with the provider certificate, the developer certificate, and the application 122 at block 212. In one embodiment, the checksum is also associated with the DRM module 124.

If the application distribution system 130 determines that the size of the application 122 is greater than the threshold value, the application distribution system 130 creates an application checksum associated with the provider certificate the developer certificate and a subset of the application 122 at block 210. In one embodiment, the size of the subset of the application 122 is less than the threshold value from block 208. In one embodiment, the subset of the application 122 includes all of the compiled source code files, but none of the data or resource files. In other embodiments, the subset of the application 122 can be selected to include any of one or more pieces of the application 122. In one embodiment, the subset of the application 122 includes one or more binary files associated with the application 122. In one embodiment, the subset of the application 122 includes the DRM 124.

In one embodiment, associating the application checksum at blocks 210 and 212 with one or more of the provider certificate and the developer certificate is optional.

In one embodiment, creating the application checksum can include using any checksum or hash function. For example, the checksum or hash function can include SHA-1, SHA-2, MD5, or MD6, to name a few.

IV. Example DRM Repackaging Process

Figure 3:
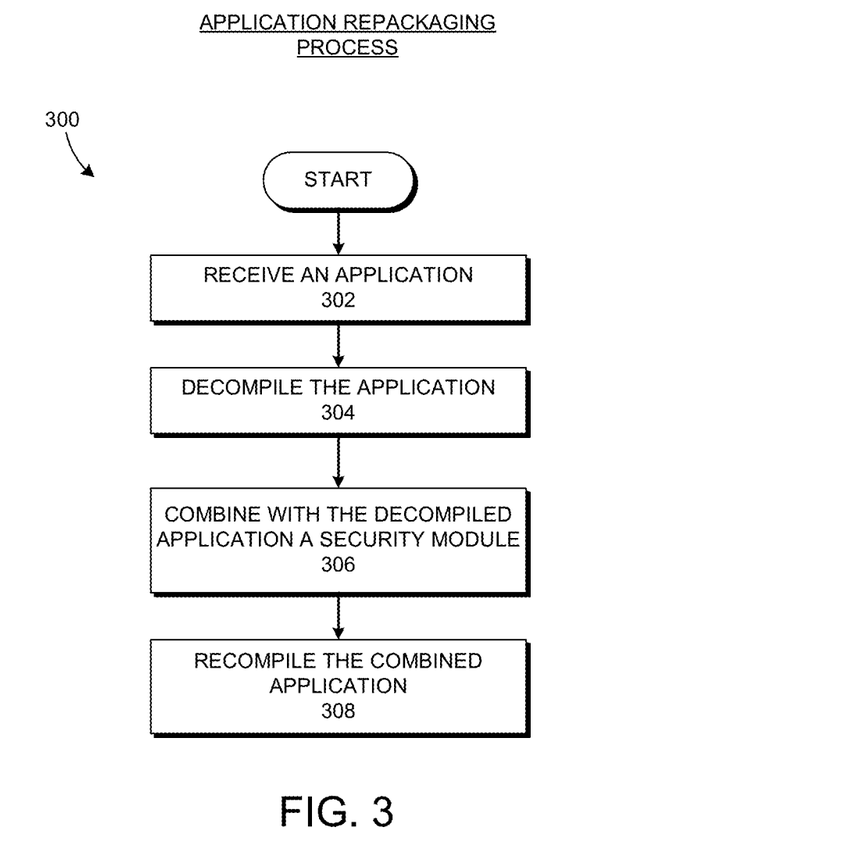
FIG. 3 illustrates a flow diagram for one embodiment of a process for combining an application and a security module.

FIG. 3 illustrates a flow diagram for one embodiment of a process 300 for combining an application 122 and a security module, such as DRM module 124. Process 300 can be implemented by the application repackaging module 134, the application submission module 144, or the IDE 146. To simplify discussion, process 300 will be described as being performed by the application repackaging module 134. However, some alternative embodiments will also be described in relation to the application submission module 144 and the IDE 146.

The process 300 begins at block 302 when an application 122 is received by, for example, the application repackaging module 134 from the developer 104 who created the application 122 or provided the application 122 to, for example, the application distribution system 130. The application repackaging module 134 decompiles the application 122 at block 304 to obtain a decompiled copy of the application 122. At block 306, the application repackaging module 134 combines the decompiled copy of the application 122 with a security module, such as DRM module 124.

In one embodiment, the security module includes one or more of a developer certificate associated with the developer 104 and an application provider certificate associated with the application distribution system 130.

In some embodiments, combining the decompiled copy of the application 122 with the security module includes identifying entry points associated with the application 122. Entry points can include any routine, component, function, method, class, or access point to an application that enables a user or a system to start, instantiate, pause, resume, launch, or initialize the application. In some embodiments, combining the decompiled copy of the application 122 with the security module includes inserting and/or injecting code associated with the security module into one or more routines, components, functions, methods, or classes, associated with the entry points.

In some embodiments, combining the decompiled copy of the application 122 with the security module includes determining one or more base classes associated with one or more parts of the application 122. Although not limited as such, these parts of the application 122 can be associated with entry points. In some embodiments, the security module is configured to be executed when one or more of the base classes are called.

In one embodiment, the security module can include replacement or supplemental lifecycle routines, classes, or methods that are called in place of, or prior to, existing lifecycle routines. For example, the security module can include a subclass of a base class used by the application 122. The subclass of the security module can be called and/or executed before any subclass of the application 122 is called and/or executed. As an example, in the Android™ operating system available for mobile devices from Google®, lifecycle entry points or routines such as onCreate( ), onStart( ), onPause( ), onResume( ) and onDestroy( ) are used by applications to handle application launch, start, pause, resume, and exit events, respectively. The security module can include versions of one or more of these lifecycle methods in a class that is a subclass of the Activity base class used by some or all Android applications. When one of the lifecycle routines is called, the security module version of the routine can be called before (or in some embodiments, after) the corresponding routine of the application 122 is called, allowing the security module to perform a DRM analysis and/or collect data about the application 122. In some embodiments, the security module completes execution before calling the base class associated with the entry point.

In some embodiments, the security module is executed in parallel and/or asynchronously with the application 122, such as in another thread of execution. The security module can therefore advantageously run in the background while allowing the application 122 to load, thereby reducing an impact on load time for the application 122. Thus, in certain embodiments, the application 122 is allowed to launch and run at least momentarily while the security module confirms whether the application 122 (or user thereof) is authorized to execute. If the application 122 or user is not authorized, the security module can then alter execution of the running application 122, for example, by killing the application 122 or disabling a feature of the application.

In some embodiments, if the security module determines that the application 122 has been modified without authorization and/or if the security module determines that an unauthorized user (or device) is accessing the application 122, the security module can present the user with a message and/or cause the application 122 to cease executing. More generally, the security module can determine whether the execution of the application 122 is limited in scope, such as to a certain subset of features offered by the application. If the execution is limited in scope, the security module can limit or alter execution of the application 122 to that scope, such as to a shareware portion of the application 122 instead of a full premium version of the application, for example. The security module can alter or otherwise modify execution of the application 122 to limit the execution to authorized features (such as shareware or unregistered features). The security module can also output a message for presentation to a user that reminds the user to register the application 122, denies the user access to the application 122, or the like.

Although many applications have a single entry point, which begins execution of the application, some applications have more than one entry point. Identifying the entry points may be an automated or manual process. In one embodiment, the entry points are identified programmatically. In some embodiments, the entry points are identified in the application 122 by the developer 104. In other embodiments, the application repackaging module 134 analyzes the application 122 to identify the entry points. In some embodiments, the application repackaging module 134 can insert code that results in the DRM module being executed each time an entry point associated with the application 122 is accessed or executed. For some devices and systems, identifying entry points at repackaging time can be optional. Instead, the DRM module can be designed to listen for entry by the application at any available entry point.

Some examples of entry points can include launching the application, terminating the application, pausing the application, and resuming the application from a waiting state. An application that uses messaging features such as text, email, or IM might also have communication-related entry points, such as read, write, and so forth. The entry points can be triggered by an operating system or by the application itself. For instance, the operating system might perform a system call to launch the application as a process. The DRM module can listen for such a system call. The application, on the other hand, might make a call to terminate itself, and the DRM module can also listen for such a call.

In one embodiment, combining the decompiled copy of the application 122 with the security module includes adding a library of code to the application 122. The library of code can include a shared library, a static-link library, a dynamic-link library ("DLL"), combinations of the same, or the like. In one embodiment, adding the library of code can include injecting the library of code into the application 122. In one embodiment, adding the library of code can include modifying the code associated with the application 122. In one embodiment, the library code can be used to listen to the application 122 and to perform the security check that is described with respect to FIG. 5 each time a call to an entry point it made.

At block 308, the application repackaging module 134 recompiles the combined decompiled copy of the application 122 with the DRM module 124. In one embodiment, the application 122 with the DRM module 124 is stored on the application store 132. The application distribution system 130 can retrieve the application 122 with the DRM module 124 from the application store 132 each time a user, such as the user 102 purchases (for a price or for free) or requests a copy of the application 122. In other embodiments, application 122 is stored with the application store 132 without the DRM module 124. In these embodiments, the application repackaging module 134 can perform process 300 each time a user attempts to obtain a copy from or access the application 122 on the application distribution system 130.

In one embodiment, the recompiled application 122 can be signed with an application provider certificate associated with the application distribution system 130.

In one embodiment, the application distribution system 130 can provide the recompiled application 122 to the developer 104 to be signed with a developer certificate associated with the developer 104.

In one embodiment, in addition to the security module, or instead of the security module, the application repackaging module 134 can use the process 300 to insert or combine any other type of module with the application 122. For example, the application repackaging module 134 can use the process 300 to insert a module that can monitor the health of the application 122 or usage statistics associated with the application 122. This information can be provided to the application distribution system 130 to facilitate making recommendations to the user 102 or to other users who own the same type of device as user systems 120.

In one embodiment, process 300 can be performed by application submission module 144 in response to the developer 104 providing the application 122 to the application submission module 144 for transmission to the application distribution system 130.

In one embodiment, process 300 can be performed in response to the developer 104 activating a feature or plugin associated with the IDE 146. In one embodiment, the IDE 146 can create a copy of the source code associated with the application 122 and can combine the copy of the source code with the DRM module 124. In one embodiment, the IDE 146 can compile the combination of the source code and the DRM module 124. In one embodiment, the IDE 146 or the application submission module 144 can provide the compiled combination to the application distribution system 130. In one embodiment, the IDE 146 or the application submission module 144 can sign the application 122 or the compiled combination of the application 122 and the DRM module 124 with a developer certificate associated with the developer 104.

In some alternative implementations, the developer system 140 submits source code of the application to the application distribution system 130 instead of the compiled application. The application distribution system 130 can then combine the DRM module 124 with the source code and compile the DRM module 124 and source code to create the application 122.

Moreover, although the process 300 has been described with respect to the application distribution system 130 repackaging the application with the DRM module 124, the DRM module 124 can be added to the application in other ways. For instance, the application distribution system 130 can provide the DRM module 124 to the developer system 140. The developer system 140 can then combine the DRM module 124 with the application to create a DRM-protected application.

V. Example Application Purchase Process

Figure 4:
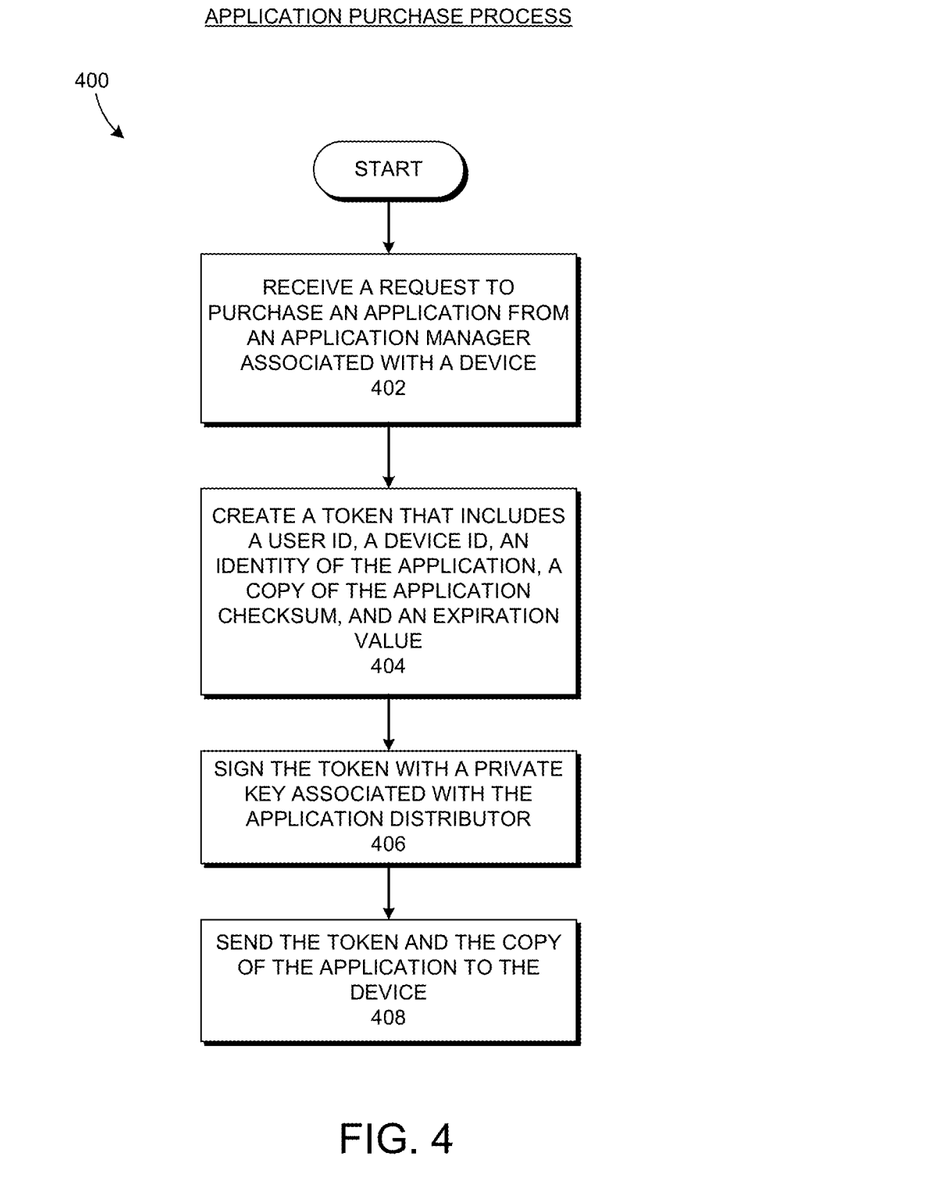
FIG. 4 illustrates a flow diagram for one embodiment of an application purchase process.

FIG. 4 illustrates a flow diagram for one embodiment of an application purchase process 400. Process 400 can be implemented by the application distribution system 130 or any other system capable of providing an application to user systems.

At block 402, a request from the application manager 126 associated with the user systems 120 to purchase an application 122 is received by, for example, the application distribution system 130. In response to the request, at block 404, the application distribution system 130 creates a security token that includes a user identifier associated with the user 102, a device identifier associated with the user systems 120, an application identifier associated with the application 122, a copy of the application checksum associated with the application 122, and an expiration value. In some embodiments, the security token can include any information that can facilitate increasing and/or decreasing access or entitlements for one or more users to the application 122. For example, the security token can include subscription information associated with a user and/or the application 122.

The security token can include information associated with sharing the application 122 among multiple users. In addition, the security token can include information associated with providing trial access to the application 122. Moreover, the security token can include information associated with one or more of: gift cards for purchasing the application 122 and/or content associated with the application 122; parental control features; limitations on when the application 122 can be executed; limitations on for how long application 122 can be executed continuously; limitations on for how long application 122 can be executed within a predefined period of time; access levels associated with different users and/or different devices; and access limitations associated with geographic locations. In one embodiment, different security tokens can be created for any variety of uses. For example, different security tokens can be created for different types of devices, access, or purchase methods, to name a few.

In one embodiment, the user identifier is associated with an account that the user 102 created with the application distribution system 130. In some embodiments, the user identifier is stored or associated with the application manager 126. In some embodiments, the user identifier is stored with the user systems 120.

In one embodiment, the device identifier is associated with the user identifier. Further, the application distribution system 130 can associate the device identifier with the account that the user 102 created with the application distribution system 130. In one embodiment, the device identifier is optional.

In one embodiment, the copy of the application checksum is created using the process 200 described in relation to FIG. 2. In one embodiment, the application checksum is created as part of block 404 using process 200. Alternatively, the application checksum is created when the application provider obtains the application 122. The application checksum can be stored with the application 122 on application store 132 and application distribution system 130 accesses a copy of the previously created checksum at block 404. The application checksum can be a hash value instead of or in addition to a checksum in certain implementations. More generally, any mathematical function can be applied to the application to create a value that can be checked against a security token.

The expiration value can include: a time when the security token expires; an amount of time that the application 122 can execute or be accessed before the security token expires; a number of times that the application 122 can execute or be accessed before the security token expires; a number of operations that the application 122 can perform before the security token expires, or any other metric for regulating the lifetime of the security token. In one embodiment, the expiration value is optional.

At block 406, the application distribution system 130 signs the security token with a private key associated with the application distribution system 130. This private key can be part of a public/private key pair associated with an application provider certificate associated with the application provider. In one embodiment, the application provider optionally encrypts the security token. At block 408, the application distribution system 130 sends the security token and the copy of the application 122 to the user systems 120. In one embodiment, the security token is encoded, such as in Base 32 or Base 64, to facilitate transmission. Alternatively, the security token is transmitted without processing or encoding.

In one embodiment, in response to the user systems receiving the security token from the application distribution system 130, the application manager 126 stores the security token with the security token store 128. In one embodiment, the application manager 126 stores the security token with the application 122 on the user systems 120.

In one embodiment, the security token can include a message that enables the application distribution system 130 to inform the user 102 of updated information related to the application 122 and/or reasons for security token check failures as described in relation to FIG. 5 below.

In one embodiment, the application 122 can be preinstalled on a device. If the application 122 is preinstalled on a device, the process 400 can begin with block 404. In some embodiments, the token and the copy of the application 122 can be provided to the device via: a network, a non-transitory computer medium, such as a memory card or a USB key, or any other mechanism for providing an application and token to a device.

VI. Example Application Execution Process

Figure 5:
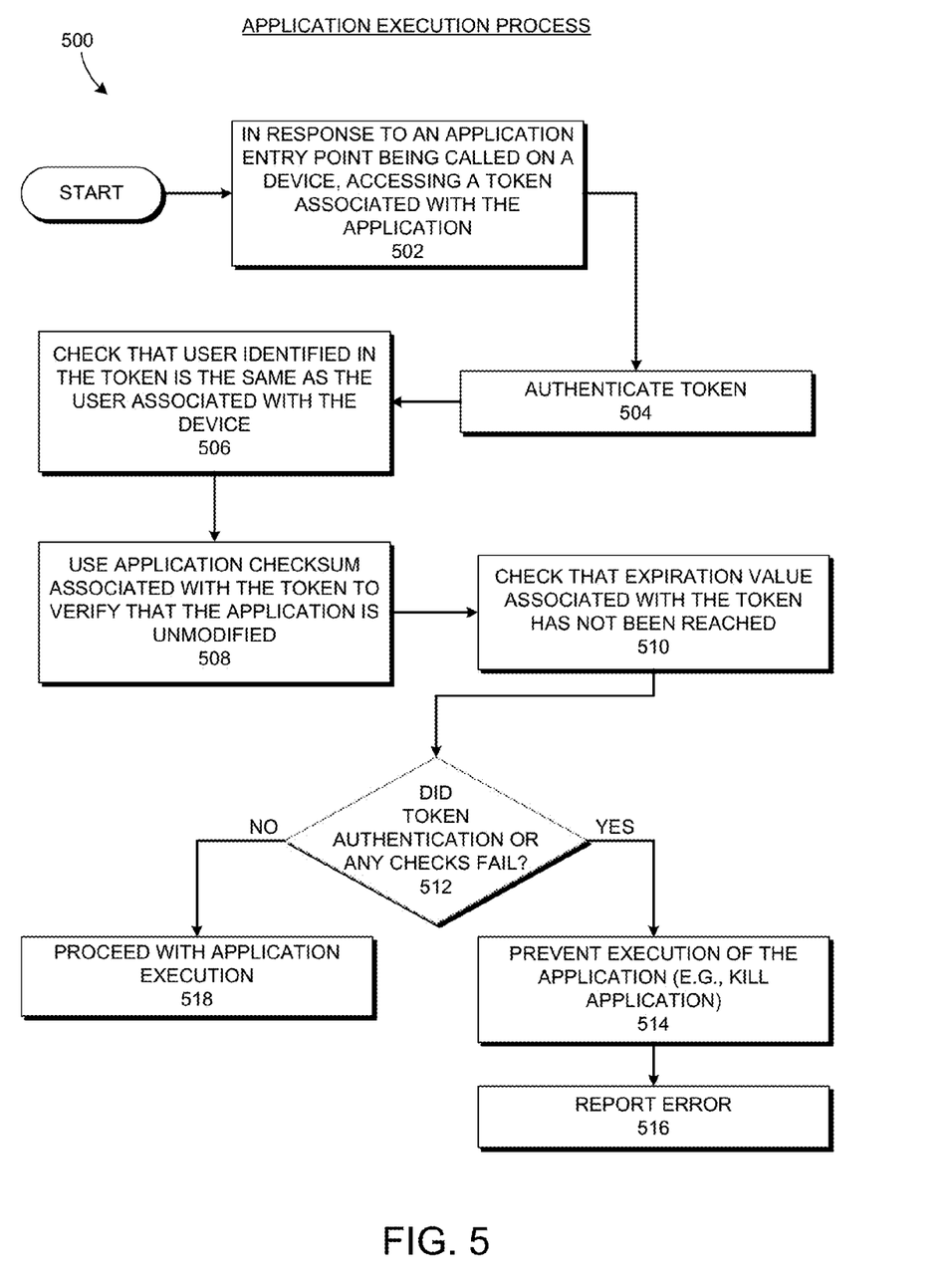
FIG. 5 illustrates a flow diagram for one embodiment of an application execution process.

FIG. 5 illustrates a flow diagram for one embodiment of an application execution process 500. In one embodiment, process 500 can be used to execute an application 122 that includes a DRM module 124. In one embodiment, process 500 facilitates preventing unauthorized access to the application 122 including unauthorized execution and unauthorized modification of the application 122.

The process begins at block 502 with DRM module 124, for example, accessing a security token associated with the application 122, in response to an application entry point associated with the application 122 being called on a user systems 120. In one embodiment, the DRM module 124 accesses the security token from the security token store 128. In an alternative embodiment, the DRM module 124 requests the security token from the application manager 126, which accesses the security token from the security token store 120.

At block 504, the DRM module 124 authenticates the security token. Authenticating the security token can include using an application provider certificate associated with the application distribution system 130 to determine whether the security token is from the application distribution system 130. In one embodiment, the application provider certificate is included with the DRM module 124 when the DRM module 124 is added to the application 122 via process 300 described with respect to FIG. 3. In one embodiment, the DRM module 124 can authenticate the security token as an off-line process, without requiring access to the network 150. In one embodiment, the DRM module 124 obtains the application provider certificate from the application distribution system 130, the certificate provider system 160, or the certificate store 162.

The DRM module 124 checks at block 506 that the user identified in the security token is the same as the user associated with the user systems 120. This check can include checking that the user identified in the security token is the same user who owns or is registered with the user systems 120 and/or the application manager 126. Note that the user associated with the user systems 120 may differ from a user accessing the application 122 on the user systems 120. For example, supposing that the user 102 is associated with the user systems 120, the user 102 can lend the user systems 120 to a second user (not shown). If the second user access application 122, the check at block 506 may pass if the user identifier in the security token is associated with the user 102. However, now suppose that the second user copies a second application with a DRM module and a security token associated with the second application to the user systems 120. The check at block 506 may fail if the second security token does not include the user identifier associated with the user systems 120, which it would not if the second application was originally from the second user's user system.

In one embodiment, block 506 includes checking that the user accessing the application 122 is the same user identified in the security token.

In one embodiment, checking that the user identified in the security token is the same as the user associated with the user system 120 includes determining which user is logged into the application manager 126. In one embodiment, determining which user is logged into the application manager 126 includes receiving a response identifying the logged-in user that is signed by a private key associated with the application distribution system 130. In another embodiment, determining whether the user is the same as a user identified in the security token includes accessing the security token from a remote server, such as the application distribution system 130 of FIG. 1 (or the interactive computing system 610 of FIG. 6).

In one embodiment, the DRM module 124 also checks that a device identifier associated with the security token is the same as a device identifier associated with one or more of the user systems 120, the user 102, and an account that the user 102 created with the application distribution system 130. Advantageously, in certain embodiments, the use of a device identifier enables the monitoring of usage information associated with the application 122. For example, this information can be used to determine if owners of certain device types use application 122 more frequently than owners of different device types. In some embodiments, the device identifier can be used as an additional security check factor. In other embodiments, the device identifier can be used to determine stability information associated with the application 122. In one embodiment, if the device identifier associated with the user system 120 does not match the device identifier in the security token, the DRM module 124 does not prevent the application 122 from continuing to execute. In one embodiment, the device id can be a fingerprint of the user system 120. The fingerprint can include a plurality of statistics and/or information associated with the user system 120. For example, one fingerprint for a user system can include, for the user system: the Central Processing Unit (CPU) model number, the CPU clock speed, the amount of Random Access Memory (RAM), the model graphics card, and the average temperature value associated with the running CPU. In one embodiment, the fingerprint can be hashed, digitally signed, and/or encrypted.

At block 508, the DRM module 124 uses an application checksum associated with the security token to verify that the application 122 is unmodified. This includes the DRM module 124 using process 200 to create a new application checksum associated with the application 122. The DRM module 124 can compute the checksum in the same manner that it was computed when initially creating the checksum, e.g., using the process 200 of FIG. 2.

The DRM module 124 compares the new application checksum to the application checksum associated with the security token to determine if the application 122 has been modified. If the application 122 has not been modified, the application checksum and the new application checksum should match. In one embodiment, in implementing process 200, blocks 204 and 206 are optional. In one embodiment, the DRM module 124 can access the application provider certificate and the developer certificate used in blocks 204 and 206 respectively from the application 122. Alternatively, the DRM module 124 accesses the application provider certificate and the developer certificate from one or more of: the certificate provider system 160, the certificate store 162, the application distribution system 130, or a designated system or storage space associated with the user systems 120.

Using an expiration value associated with the security token, the DRM module 124, at block 510, checks that the security token has not expired. Checking that the expiration value has not been reached may include a number of different operations depending on the type of expiration value associated with the security token. Further, there may be multiple expiration values associated with the security token, each of which can be checked by the DRM module 124 at block 510. Some non-limiting examples of the expiration check operations can include one or more of: checking whether an expiration time has been reached; determining if the application 122 has been used a predetermined number of times; determining if a number of operations associated with the application 122 have been performed; and determining if the application 122 has been executed for a predetermined period of time, to name a few. In one embodiment, block 510 is optional.

In one embodiment, the application manager 126 performs block 510 in response to the application entry point being called at block 502. Alternatively, or in addition, application manager 126 and/or DRM module 124 performs block 510: continuously, at predetermined time intervals, and/or each time the user systems 120 is able to connect to the network 150 and/or the Internet.

In one embodiment, the application manager 126 and/or the DRM module 124 attempt to renew the security token: upon determining that the security token expired; at a predetermined time before the security token is set to expire, at a predetermined point before the metric associated with the expiration is set to be reached (for example, is the expiration is based on number of uses of application 122, the predetermined point may be five uses before the security token expires), in response to a command received from the user 102, or in response to any other criteria being satisfied. In some embodiments, renewing the security token may include accessing a new security token from the application provider for a cost or for free. Advantageously, in certain embodiments, accessing a new security token enables a subscription based model. Further, in certain embodiments, accessing a new security token advantageously enables informing a user of security-related or application stability-related changes. For example, suppose that it is determined at some point after user 102 has obtained a copy of the application 122 that application 122 is malware. In this example, the application distribution system 130 can provide an updated security token to the user systems 120 that prevents the application 122 from being executed, such as by setting the expiration value to indicate that the updated security token is expired, and that can optionally provide a message to the user 102 informing the user 102 why the security token is expired.

As a second example, suppose that it is determined that a number of users who own the same type of device as user systems 120 have had stability issues with the application 122. In this example, the application distribution system 130 can provide an updated security token preventing the application 122 from being executed and optionally including a message informing the user 102 of the stability issue. Alternatively, the updated security token may allow the application 122 to be executed, but may provide the message informing the user 102 of the stability issue.

In one embodiment, the application manager 126 can periodically, or continuously during times of network connectivity, communicate with the application distribution system 130 to determine if the application distribution system 130 has a new security token associated with the application 122. If so, the application manager 126 can obtain the new security token. In some embodiments, the continuous or periodic communication with the application distribution system 130 enables the application distribution system 130 to provide new security tokens, without waiting for a security token renewal request, to purchasers of application 122 upon determining a security or stability-related issue associated with the application 122.

In one embodiment, upon determining that a security or stability-related issue associated with the application 122 exists, a new token that prevents further execution of the application 122 can be provided to the application manager 126. In one embodiment, the new token can include a new expiration value that indicates that the new token is expired thereby preventing further execution of the application 122. In one embodiment, the token and/or the new token includes a safe to execute bit, which indicates that the application 122 is safe to execute (e.g., secure or stable when executed on the users systems 120) when set to a value, such as 1, and which indicates that the application 122 is not safe to execute (e.g., includes malware, a memory leak, or is not stable when executed on the user system 120) when set to the opposite value, such as 0. In one embodiment, the new token can include a message indicating whether the application 122 is safe to execute.

In one embodiment, upon determining that a security or stability related issue associated with the application 122 exists, a token associated with the application 122 can be modified to prevent further execution of the application 122. For example, an expiration value associated with the token can be modified to indicate that the token is expired. As a second example, a safe to execute bit can be flipped to indicate that the application 122 is no longer identified as safe to execute. As another example, a message can be altered, or added to the token to indicate that the application 122 is no longer identified as safe to execute.

In one embodiment, upon determining that a security or stability related issue associated with the application 122 exists, a token associated with the application 122 can be deleted from the user systems 120 or otherwise rendered unusable by the DRM module 124.

In one embodiment, the application manager 126 can obtain a new security token associated with the application 122 anytime that the user systems 120 has network connectivity. Alternatively, the application manager 126 can obtain a new security token in response to a bandwidth associated with the network connectivity exceeding a threshold. In one embodiment, the application manager 126 can check for or obtain a new security token when a specific network connectivity type is used to connect to the network 150. Alternatively, the application manager 126 can check for or obtain a new security token when connected to the network 150 unless a specific network connectivity type is used. For example, application manager 126 can check for and/or obtain new security tokens when the user systems 120 is using a Wi-Fi connection. Thus, in this example, the application manager 126 may not check for and/or obtain a new security token if the user systems 120 is using a cellular connection, such as a GSM connection.

At decision block 512, the DRM module 124 determines if the security token authentication or the checks associated with the blocks 504, 506, 508, and 510 failed. This check can also include determining if the DRM module 124 was able to successfully access a security token associated with the application 122 at block 502. If the DRM module 124 was able to successfully access a security token associated with the application 122, and if none of the checks associated with the blocks 504, 506, 508, and 510 failed, the DRM module 124 allows the application 122 to continue executing at block 518.

If DRM module 124 was unable to successfully access a security token associated with the application 122, or if one or more of the checks associated with the blocks 504, 506, 508, and 510 failed, the DRM module 124 prevents the application 122 from continuing to execute, by, for example, killing the application 122 at block 514. Optionally, at block 516, the DRM module 124 can cause an error to be presented to the user 102. This error can inform the user 102 that: the application 122 cannot be executed; why the application 122 cannot be executed; what steps, if any, the user 102 can take to successfully execute the application 122; whether the user 102 can obtain a refund, and if so, how the user 102 can obtain a refund; and any other information that may be associated with the application 122 not executing.

In one embodiment, if the DRM module 124 was unable to successfully access a security token associated with the application 122, or if one or more of the checks associated with the blocks 504, 506, 508, and 510 failed, the DRM module 124 allows the application 122 to continue executing, but in a reduced state. For example, the DRM module 124 may prevent access to parts of the application 122 or to a subset of services or features associated with the application 122. As a second example, the DRM module 124 may allow access to all of the application 122, but at reduced functionality (e.g., reduced speed, graphics, with ads, or the like). In one embodiment, the DRM module 124 provides full access to the application 122, but presents the user with a message reporting the unsuccessful attempts to access a security token or to perform one or more of the checks associated with the blocks 504, 506, 508, and 510. In one embodiment, the message can be presented to the user one or more times at predefined and/or random intervals of time. In one embodiment, if the DRM module 124 was unable to successfully access a security token associated with the application 122, or if one or more of the checks associated with the blocks 504, 506, 508, and 510 failed, the DRM module 124 causes the user to be presented with an opportunity to purchase a copy of the application 122 or to renew a subscription associated with the application 122.

In one embodiment, one or more of blocks 504, 506, 508, and 510 is optional. In one embodiment, block 512 includes determining if any non-optional check failed.

In some embodiments, as described in relation to FIG. 2, a checksum associated with an application includes one or more digital certificates. In some embodiments, the application provider can obtain new digital certificates associated with itself or with the developer 104. In some embodiments, in response to obtaining new digital certificates, the application provider can use process 200 to create new checksums using the new digital certificates. Further, in some embodiments, the application repackaging module 134 can use process 300 to repackage or recombine a security module or DRM module with a copy of the application. This enables the inclusion of the new digital certificates. In some embodiments, when the DRM module 124 or the application manager 126 attempts to renew a security token, the application distribution system 130 can provide a new copy of the application that includes the new digital certificates along with the updated security token. Advantageously, in certain embodiments, application distribution system 130 can update or change digital certificates periodically or in response to a digital certificate being compromised by a malicious user. In one embodiment, application distribution system 130 can update or change digital certificates in response to one or more digital certificates expiring. To facilitate continuous accessibility to application 122, in one embodiment, application distribution system 130 can update or change digital certificates at some predetermined time prior to one or more digital certificates expiring.

In one embodiment, the application distribution system 130 can push new security tokens to the user systems 120. In certain embodiment, pushing new security tokens advantageously allows the application distribution system 130 to update security tokens without waiting for the user systems 120 to contact the application distribution system 130.

VII. Example Interactive Computer System

Figure 6:
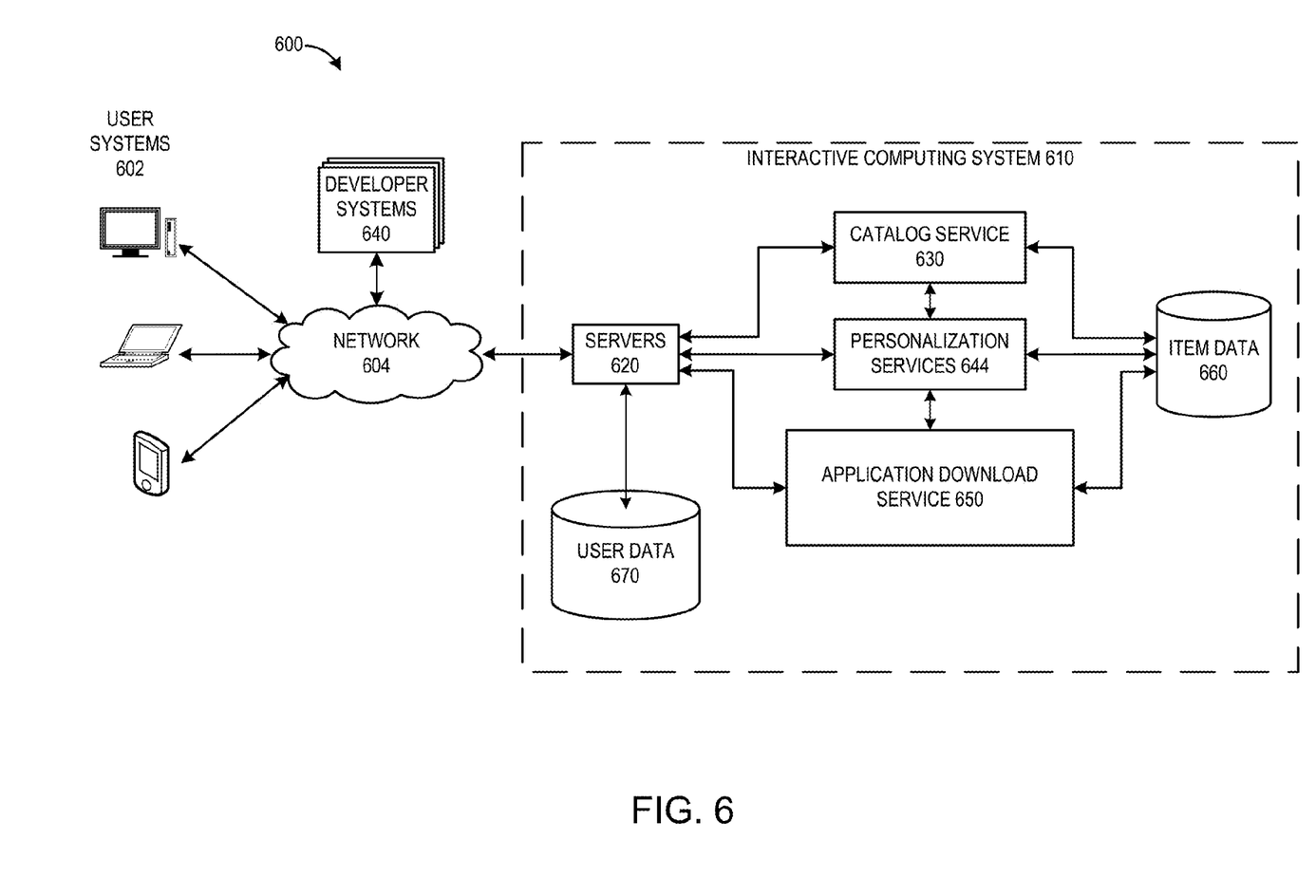
FIG. 6 illustrates an embodiment of a networked computing environment that can implement the features described herein in the context of an interactive computing system.

FIG. 6 depicts an embodiment of a networked computing environment 600 that can implement the various DRM features described herein in the context of an interactive computing system 610. The interactive computing system 610 can provide network applications for access by user systems 602 over a network 604. The interactive computing system 610 provides application distribution features that provide access to applications for the user systems 602. Further, the interactive computing system 610 can provide an electronic catalog and associated services for browsing, searching, and otherwise exploring the electronic catalog.

The user systems 602 that access the interactive computing system 610 can include all of the functionality of user systems described above. For instance, the user systems 602 can access applications that include DRM protection associated with each application. The user systems 602 access the interactive computing system 610 over the network 604, which can be a local area network or a wide area network (such as the Internet).

The interactive computing system 610 can be implemented with one or more physical servers or computing machines. Thus, each of the components depicted in the interactive computing system 610 can include hardware and/or software for performing various features. In one embodiment, the interactive computing system 610 is a web site or collection of web sites. Like the interactive computing system 610, developer systems 640 can be implemented in hardware. The developer systems 640 can include any type of computing device and can include all the functionality of the developer systems described above. The developer systems 640 can, but need not be, operated by entities who are different from one another and who are different from an operator of the interactive computing system 610.

In the depicted embodiment, the interactive computing system 610 includes several components that can be implemented in hardware and/or software. For instance, the interactive computing system 610 includes one or more servers 620 for receiving and responding to network requests from the user systems 602. The one or more servers 620 can include web servers, application servers, database servers, combinations of the same, or the like. The interactive computing system 610 also includes a catalog service 630 and associated search engine in communication with the one or more servers 620. Users can browse an electronic catalog provided by the catalog service 630 or query the search engine to obtain information about electronic catalog content stored in an item data repository 660.

The electronic catalog content can include information about products and/or services. In one embodiment, this content is arranged in a hierarchical structure, having items associated with one or more categories or browse nodes in a hierarchy. The catalog service 630 can provide functionality for users to browse the item hierarchy in addition to searching the catalog. Users can select an item represented in the hierarchy or in a list of search results to see more details about an item. In response to a user item selection, the server 620 can provide to a user system 602 a catalog page (sometimes called an item detail page) that includes details about the selected item.

The personalization services 644 can include services for providing personalized information to users. Examples of personalization services 644 include recommendation services, personalized search services, and tag-based services. A recommendation service can use any of a variety of algorithms for generating recommendations, including behavior-based algorithms. In some embodiments, such behavior-based algorithms can analyze user behavior to generate item-to-item mappings and can use these mappings to recommend items related to a user's item selection activities. Examples of recommendation algorithms that can be used herein are described in U.S. Publication No. 2002/0198882, filed Jan. 14, 2002, titled "Content Personalization Based on Actions Performed During a Current Browsing Session," the disclosure of which is hereby incorporated by reference in its entirety. Personalized search services can recommend search queries to users, in some implementations. Tag-based services can provide functionality for users to apply textual tags to items in the catalog to thereby categorize the items. Other personalization services can include list services, where users create lists of items, blogging services, personalized social networking services, and the like.

Further, the interactive computing system 610 includes an application download service 650. The application download service 650 can include all the functionality of the application distribution system 130 described above. The application download service 650 can include the functionality of an application store (or "app store"), making applications available for purchase or free download to the user systems 602. The application download service 650 can include components for browsing and/or searching a catalog of applications, which may be stored in the item data repository 660. The application download service 650 can, but need not, rely on the functionality of the catalog service 630 for this browse and/or search functionality. The application download service 650 can also combine DRM functionality with applications to enable protection from copying or modifying of applications. Further, in some embodiments, the application download service 650 can interact with the personalization services 644 to generate and/or obtain recommendations for users based on application selection or usage behavior, among possibly other recommendation criteria.

The processing of the various components of the interactive computing system 610 can be distributed across multiple machines, networks, and other computing resources. The various components of the interactive computing system 610 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

VIII. TERMINOLOGY

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of managing access to an application, the method comprising:
   receiving a compiled application from a developer associated with the compiled application, the compiled application including one or more first executable files;
   decompiling the compiled application by converting at least a portion of the one or more first executable files into one or more first source code files;
   adding a digital rights management (DRM) module to the one or more first source code files by modifying the one or more first source code files to refer to the DRM module, the DRM module comprising a second source code file and configured to protect a modified application created based on the one or more first source code files and the second source code file against one or both of copying and modification;
   recompiling the one or more first source code files together with the second source code file of the DRM module added thereto to produce the modified application, the modified application comprising a second executable file; and
   creating a security token associated with the modified application, the security token including at least one of a user identifier or a device identifier, wherein creating the security token comprises generating integrity data corresponding to at least a portion of the modified application, the integrity data indicating whether the modified application includes an unauthorized modification,
   wherein at least the adding is implemented by a computer system comprising computer hardware.

2. The method of claim 1, further comprising identifying an entry point associated with the one or more first source code files.

3. The method of claim 2, wherein the adding the DRM module further comprises inserting DRM code into a portion of one or more first source code files that relate to the entry point.

4. The method of claim 2, wherein the entry point is configured to perform at least a portion of one or more of the following: launching the application, terminating the application, pausing the application, and resuming the application from a paused state.

5. The method of claim 2, wherein at least a portion of the DRM module is configured to execute before a portion of the application associated with the entry point.

6. The method of claim 1, wherein the adding the DRM module further comprises performing dynamic-link library (DLL) injection.

7. The method of claim 1, further comprising signing the modified application with a developer certificate issued by a certificate authority.

8. The method of claim 7, wherein the signing the modified application comprises using a private key associated with the developer certificate to generate the integrity data.

9. The method of claim 1, further comprising adding a usage monitoring module to the one or more first source code files, the usage monitoring module configured to monitor usage statistics for the application.

10. The method of claim 1, wherein the DRM module is configured to cause the modified application to at least partially cease operating in response to determining that the modified application is accessed by an unauthorized user.

11. The method of claim 1, wherein the DRM module is configured to limit an unauthorized user's access to the modified application to a subset of features of the modified application.

12. The method of claim 1, wherein the integrity data comprises a checksum corresponding to the at least the portion of the modified application.

13. The method of claim 1, wherein at least a portion of the DRM module is configured to execute in parallel or asynchronously with the application.

14. The method of claim 1, wherein the DRM module is configured to:
   allow the application to execute while the DRM module determines whether the application is authorized to execute; and
   in response to determining that the application is not authorized to execute, perform one of (i) terminating the application that is currently executing or (ii) disabling a feature of the application.

15. The method of claim 1, further comprising providing the recompiled application to the developer to be digitally signed with a developer certificate associated with the developer.

16. A system for managing access to an application, the system comprising:
   an application distribution system comprising computer hardware configured to:
      receive a compiled application including one or more first executable files;
      decompile the compiled application by converting at least some of the one or more first executable files into one or more source code files;
      modify the one or more source code files to refer to a security module and thereby produce updated source code files, the security module configured to protect a modified application created based on the updated source code files against one or both of copying and modification,
      recompile the updated source code files together with the security module to create the modified application, the modified application comprising a second executable file; and
      create a security token associated with the modified application, the security token including at least one of a user identifier or a device identifier, wherein creating the security token comprises generating integrity data corresponding to at least a portion of the modified application, and wherein the security module is configured to use the security token to at least partially authenticate the application to determine whether the modified application includes an unauthorized modification.

17. The system of claim 16, wherein the application distribution system is further configured to provide the modified application to one of a plurality of end-user devices together with the security token.

18. The system of claim 17, wherein providing the security token enables the security module to authenticate the application without access to a network connection.

19. The system of claim 17, wherein the application distribution system is further configured to remotely disable the security token to at least partially prevent the application from being executed.

20. Non-transitory physical computer storage comprising instructions stored thereon that, when executed by one or more processors, perform operations comprising:
- receiving a compiled application including a first executable file;
- decompiling the compiled application to obtain a source code file;
- combining a usage module with the source code file to create a modified source code file;
- recompiling the modified source code file with the usage module to create a modified application, the modified application comprising a second executable file; and
- creating a security token associated with the modified application, the security token including at least one of a user identifier or a device identifier, wherein creating the security token comprises generating integrity data corresponding to at least a portion of the modified application, the integrity data indicating whether the modified application includes an unauthorized modification.

21. The non-transitory physical computer storage of claim 20, wherein the usage module comprises a security module configured to prevent unauthorized access to the modified application.

22. The non-transitory physical computer storage of claim 20, wherein the usage module comprises a usage monitoring module configured to obtain usage statistics for the modified application.

23. The non-transitory physical computer storage of claim 20, wherein the source code file comprises code associated with an entry point of the compiled application.

* * * * *